United States Patent
Branning et al.

(10) Patent No.: US 7,987,666 B2
(45) Date of Patent: Aug. 2, 2011

(54) COOLING APPARATUS FOR EXHAUST GAS TEMPERATURE CONTROL DEVICES

(75) Inventors: Isaac D. Branning, Arcola, IN (US); Brad D. Singer, Woodburn, IN (US); Donald J. Kortenber, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 966 days.

(21) Appl. No.: 11/863,537

(22) Filed: Sep. 28, 2007

(65) Prior Publication Data

US 2009/0084096 A1    Apr. 2, 2009

(51) Int. Cl.
    *F01N 3/02* (2006.01)
(52) U.S. Cl. ............ 60/317; 60/297; 60/298; 60/311; 60/319; 60/324
(58) Field of Classification Search .......... 60/297, 60/311, 324, 298, 317, 319, 322
    See application file for complete search history.

(56) References Cited

U.S. PATENT DOCUMENTS

| | | |
|---|---|---|
| 1,783,674 A | 12/1930 | Rehwold et al. |
| 2,211,795 A | 8/1940 | Sauer |
| 2,293,632 A | 8/1942 | Sauer |
| 2,398,942 A | 3/1946 | Couch |
| 3,186,511 A | 6/1965 | Kliewer, Sr. |
| 3,657,878 A | 4/1972 | Kaufmann, Jr. |
| 4,265,332 A * | 5/1981 | Presnall et al. .......... 181/211 |
| 4,903,484 A * | 2/1990 | Yates et al. .......... 60/316 |
| 5,454,139 A | 10/1995 | Beck |
| 6,832,665 B2 | 12/2004 | Crombeen |
| 2005/0205355 A1 | 9/2005 | Lin |

FOREIGN PATENT DOCUMENTS

JP    2004124729 A    4/2004

* cited by examiner

*Primary Examiner* — Thomas E Denion
*Assistant Examiner* — Diem Tran
(74) *Attorney, Agent, or Firm* — Jeffrey P. Calfa; Mark C. Bach

(57) ABSTRACT

Temperature control devices have become common to cool the exhaust stream from a diesel particulate filter before release into the environment. To further cool the filtered exhaust stream and to protect the temperature control device, a duct can be used to surround the inlets of the temperature control device. The duct has a head section surrounding the inlets at one end and a base section extending from the head section with a vent at the other end. Ambient air is drawn through the vent into the duct and into the inlets of the temperature control device to further cool the filtered exhaust stream.

14 Claims, 8 Drawing Sheets

COOLING APPARATUS FOR EXHAUST GAS TEMPERATURE CONTROL DEVICES

BACKGROUND OF THE INVENTION

1. Field of the Invention

The present invention relates to exhaust systems and more particularly to the reduction of exhaust gas temperature without affecting operation of pollution control elements of the exhaust system.

2. Description of the Prior Art

Elevated exhaust gas temperatures from the tail pipes of diesel engine equipped motor vehicles have become a greater problem with the introduction of diesel particulate trap/filters (DPF) and the need to regenerate these filters. Diesel particulate filters remove unburned and partially burned hydrocarbons from the exhaust streams produced by diesel engines. A DPF may be periodically regenerated by raising the temperature in the filter sufficiently to accelerate the oxidation of or ignite the particulate matter trapped in the filter. This process, once initiated, further increases the temperature of the exhaust stream downstream from the filter. The increase in the temperature of the exhaust may singe passers-by, particularly where the exhaust is discharged near ground level, and add stress on exhaust pipes.

The prior art frequently, though not universally, achieved exhaust gas cooling as a byproduct of cooling a component, such as a muffler, in the exhaust system. In some contemporary pollution control schemes components of the exhaust gas treatment system must run hot in order to operate or regenerate making it undesirable to reduce exhaust gas temperature ahead of the component in question or to reduce the temperature of the component itself. For example, diesel particulate filter regeneration requires maintaining the temperature of the filter during regeneration.

There is thus a need to cool the exhaust gas after the exhaust leaves the filter. It remains desirable to protect pipes of the exhaust system from the high temperatures which attach to the casing housing the filter as well as reduce the danger of singing passers-by.

Reducing the exhaust gas temperature after leaving the diesel particulate filter can be accomplished with a temperature control device. The temperature control device typically has inlets that allow fresh air into the device can form a venturi to mix the exhaust gas with the air.

While this device works well to reduce the temperature of the exhaust, some exhaust can escape from the system if the tail pipe is clogged or plugged. Because the exhaust gasses are hot, they could potentially burn someone walking by. Furthermore, if the inlets in the device become blocked with debris or by other equipment, the temperature of the exhaust will rise above acceptable levels.

Therefore, there remains a need to reduce the temperature of the exhaust gas without allowing the exhaust gas to escape out of the temperature control device, especially if the end of the exhaust pipe is plugged. There is also a need to prevent the inlets of the device from becoming blocked. In addition, there is a need to further reduce the temperature levels of the exhaust.

SUMMARY OF THE INVENTION

According to the invention, an apparatus cools the exhaust flow from a motor vehicle exhaust system before discharge into the environment for drawing ambient air into the exhaust stream. The exhaust system includes elements providing air pollution treatment, such as catalytic converters and particulate filters for diesel vehicles. The catalytic converters and diesel particulate filters are installed in canisters or housings replacing portions of the exhaust pipe in the exhaust system. While either element can be a heat source, diesel particulate filters are subject to particularly high temperatures, which are required for regeneration of the filter. Passive cooling of the exhaust through ventilation of the exhaust system is provided by drawing ambient air into a temperature control device and into the exhaust stream without a significant reduction of the operating temperature of the pollution treatment element, particularly in the case of diesel particulate filters. Cooling is advantageously introduced to the exhaust system after the diesel particulate filter to reduce the temperature of the exhaust gas as it is returned to the exit tubing proper without affecting operation of the pollution control element.

In order to further cool the filtered exhaust stream and to protect the temperature control device, a duct can be used to surround the inlets of the temperature control device, such as an exhaust diffuser. The duct has a top, a bottom, opposite first and second lateral walls between the top and bottom, a closed end, and an opposite vented end. The duct has a head section surrounding the inlets of the temperature control device and includes the closed end. The duct also has a base section with a vent. The base section extends from the head section to the vented end.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
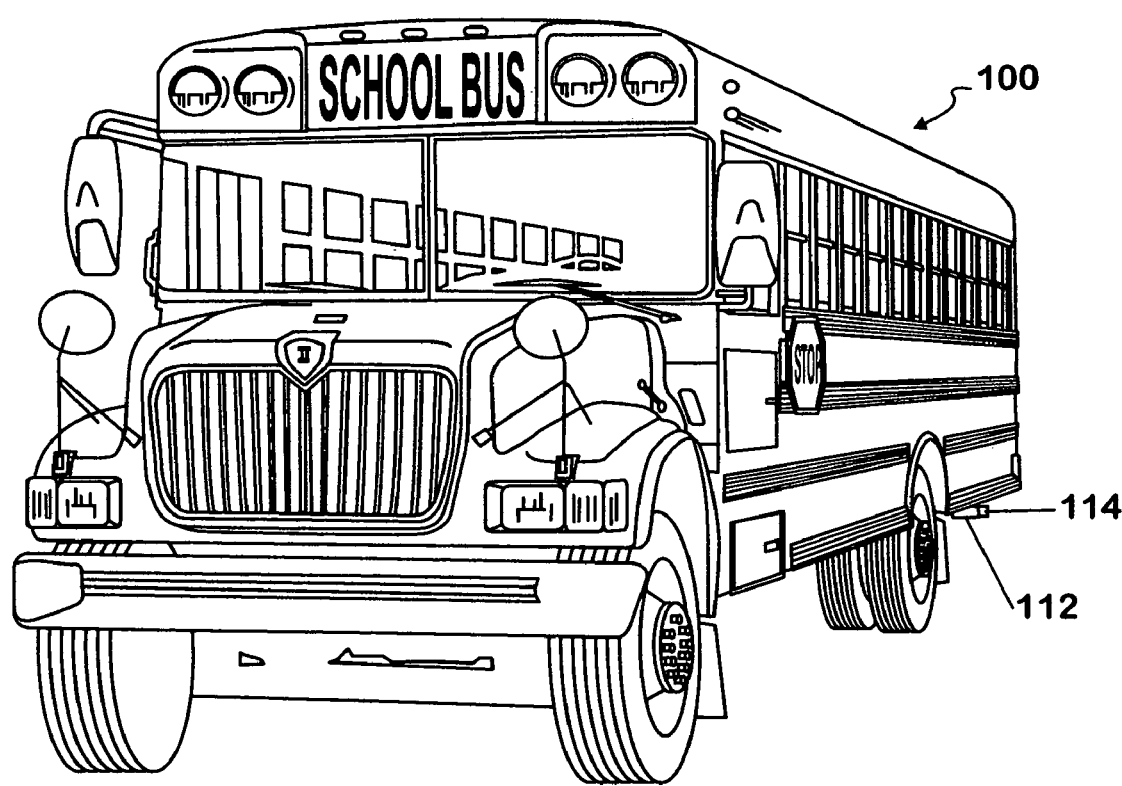
FIG. 1 is a perspective view of a school bus which may be equipped with an exhaust system modified to incorporate the present invention.

Referring to the drawings and in particular referring to FIG. 1, a vehicle such as a school bus 100, which is typically equipped with a diesel engine requiring use of a diesel particulate filter (DPF), is shown. In a vehicle such as school bus 100, the tail pipe 112 of an exhaust system typically runs under the vehicle to a point of discharge 114 along the side or back of the vehicle. The point of discharge 114 is at a level where passers-by can be directly exposed to discharge of exhaust from the pipe 112.

Figure 2:
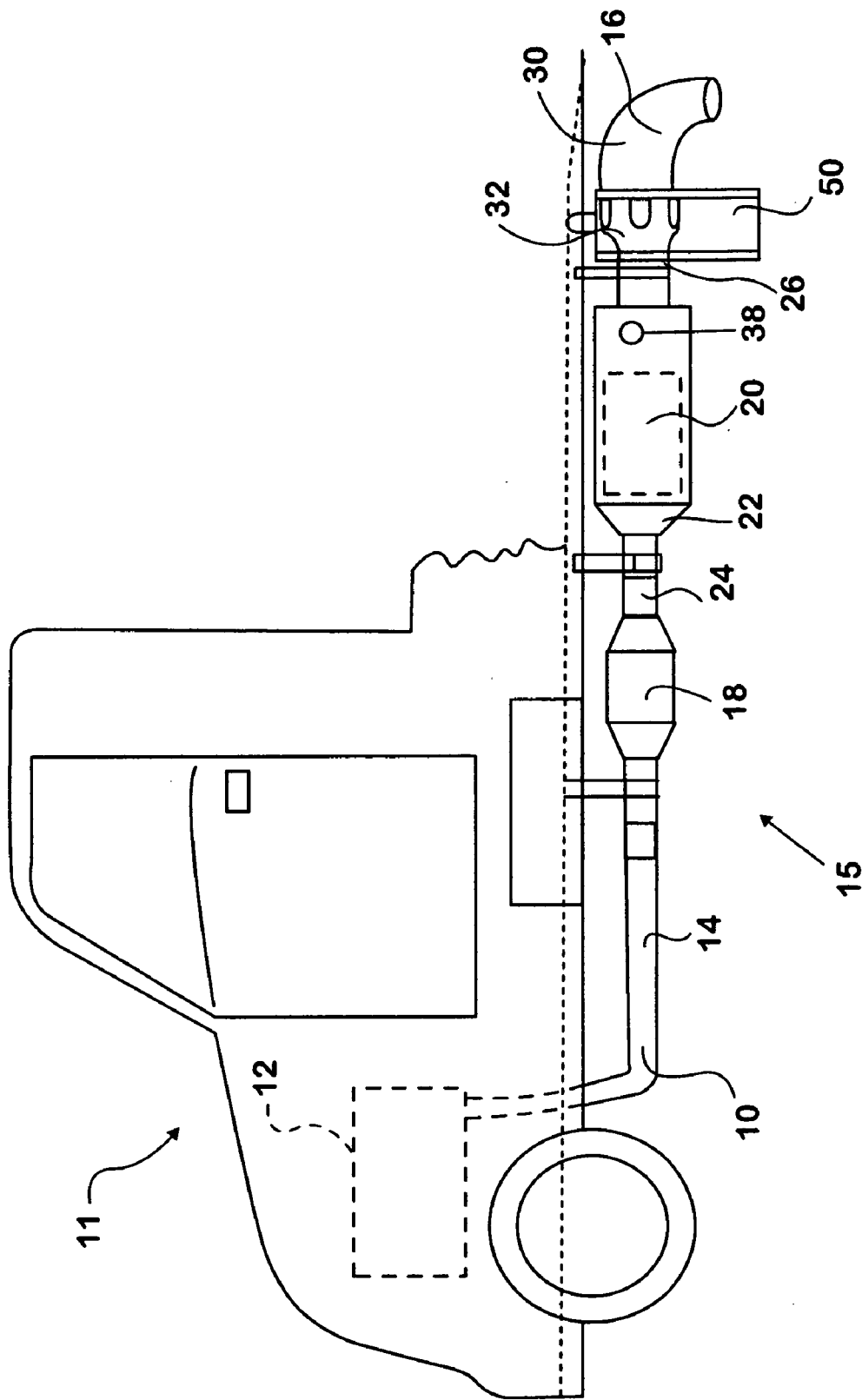
FIG. 2 is a plan view of a vehicle equipped with an exhaust system modified to incorporate the present invention with the top of the duct removed.
Figure 3:
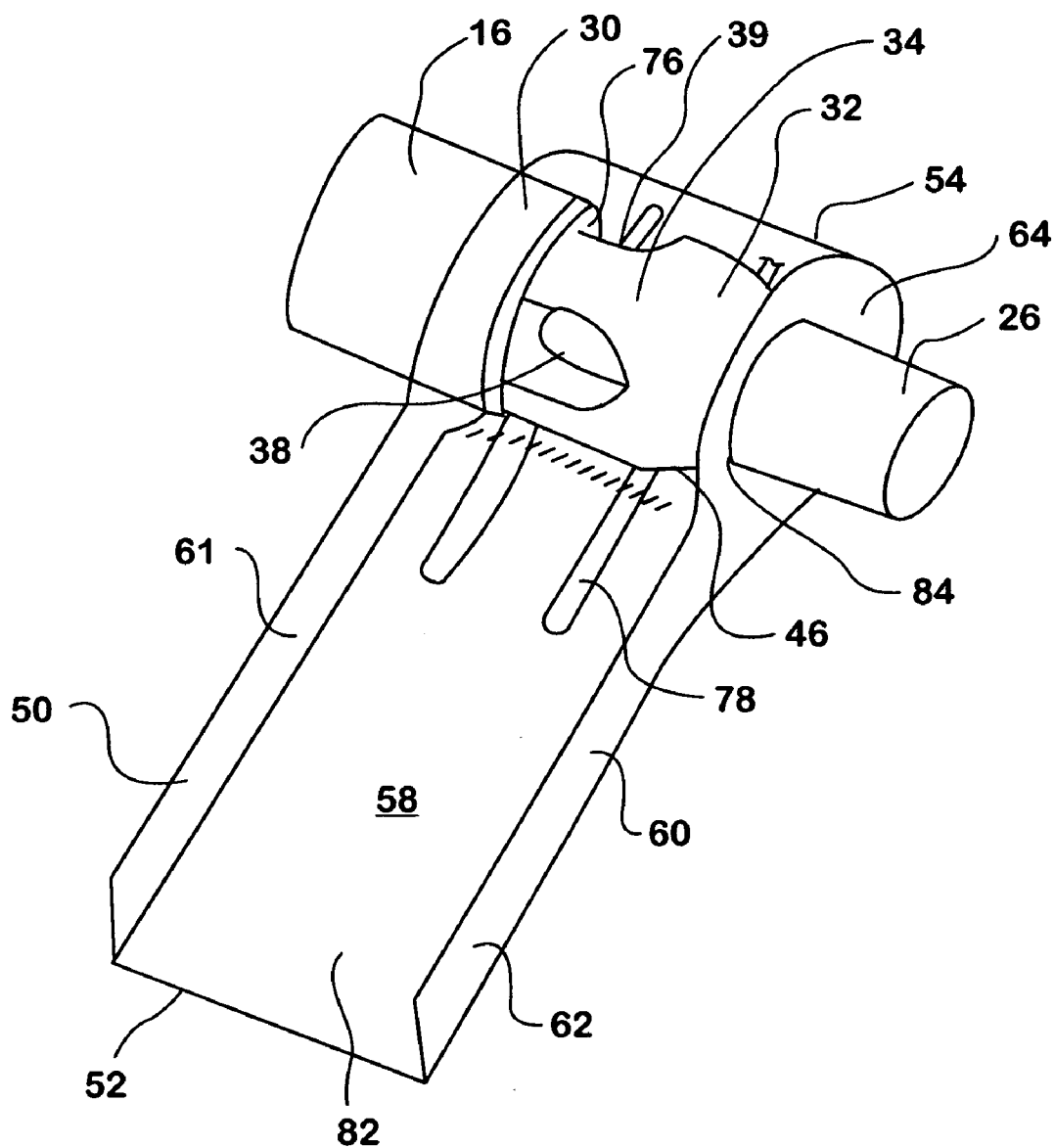
FIG. 3 is a perspective view of a temperature control apparatus with the top of the duct removed.
Figure 4:
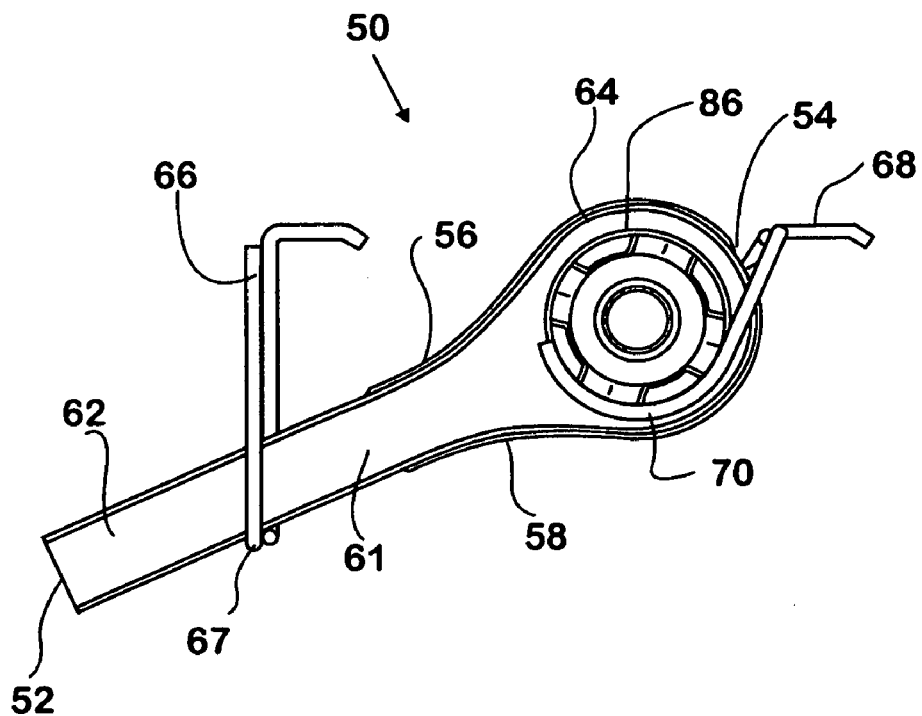
FIG. 4 is a side view of a temperature control apparatus of the invention.
Figure 5:
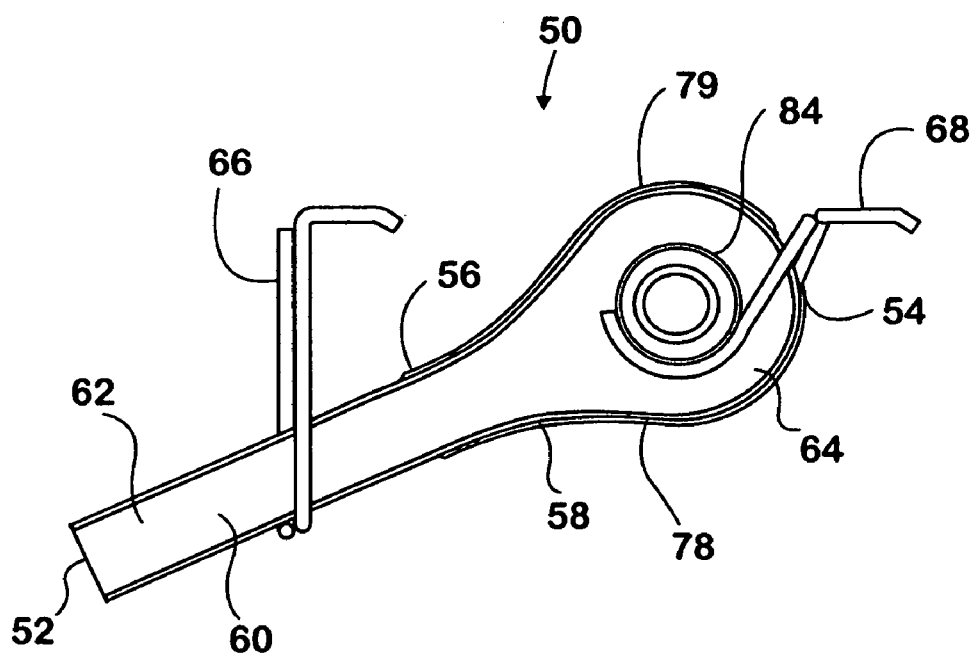
FIG. 5 is a side view of a temperature control apparatus of the invention.
Figure 6:
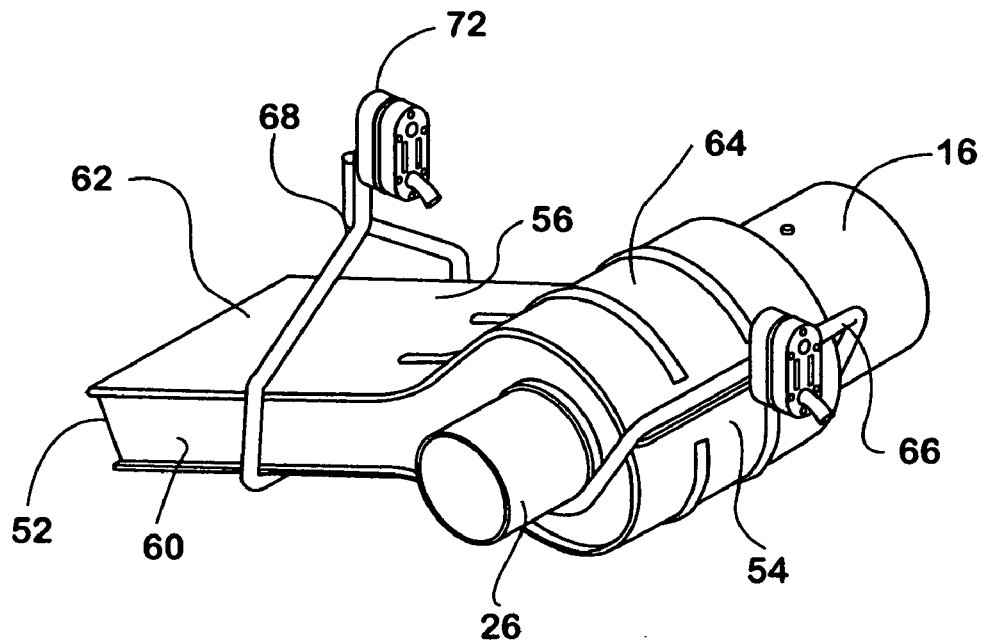
FIG. 6 is a perspective view of a temperature control apparatus of the invention.
Figure 7:
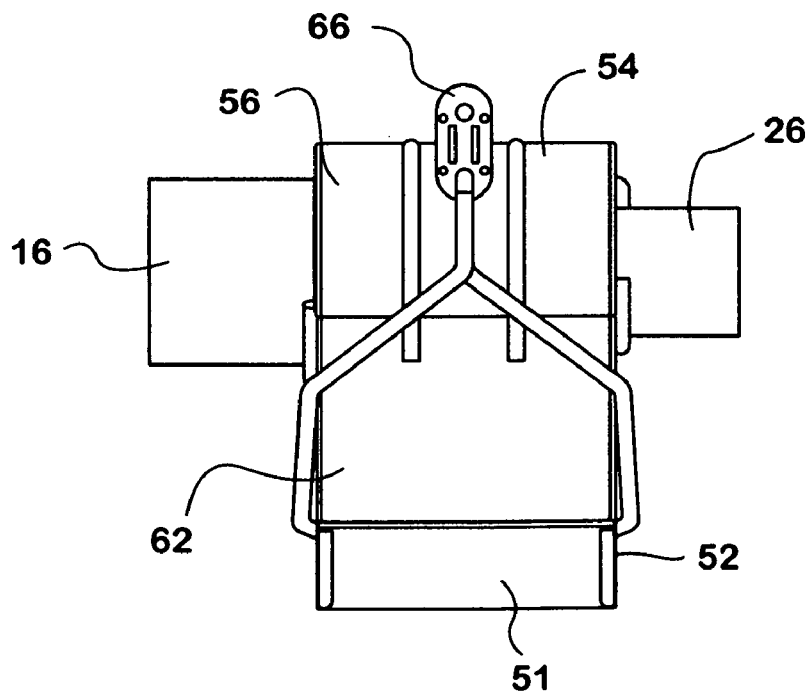
FIG. 7 is a front plan view of a temperature control apparatus of the invention.
Figure 8:
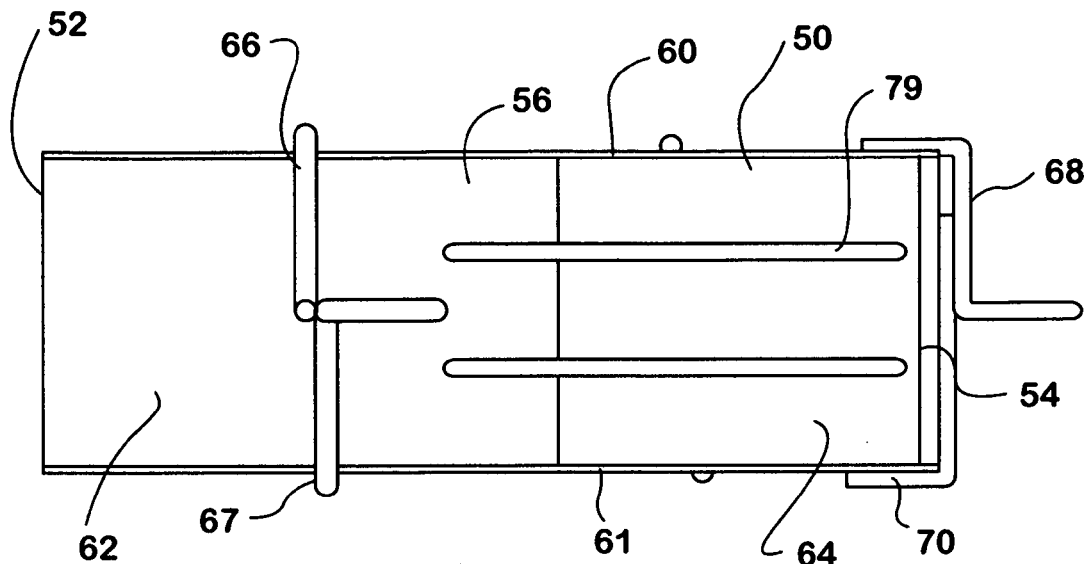
FIG. 8 is a top plan view of a temperature control apparatus of the invention.
Figure 9:
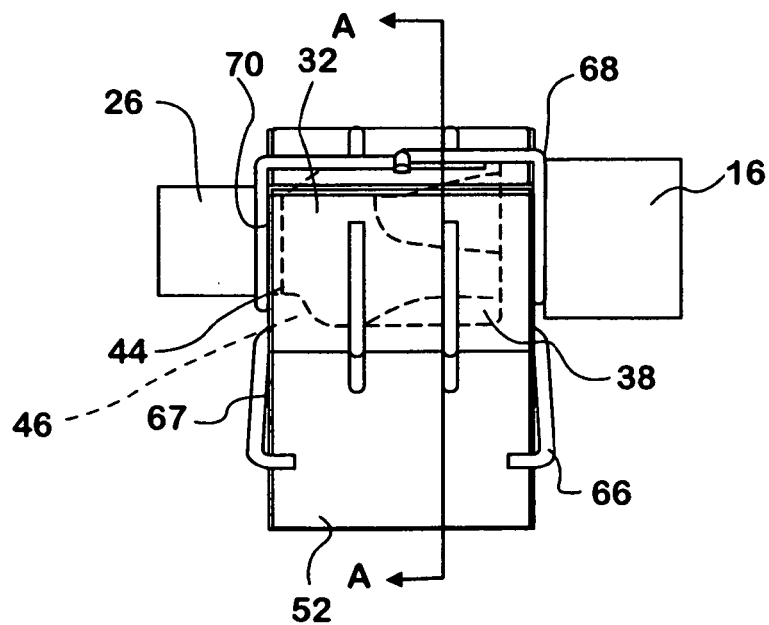
FIG. 9 is a rear plan view of a temperature control apparatus of the invention.

The present invention as shown in FIG. 2 relates to an apparatus for an exhaust system 10 which can be used for a motor vehicle 11, such as a truck or school bus. The exhaust system 10 is installed on the motor vehicle 11 to the chassis 28 horizontally or under the vehicle 11.

The engine 12 is in fluid communication with the filter assembly 13 through entrance tubing 14 at the inlet side of the filter assembly 13. Treated exhaust flows from the filter assembly 13 through exit tubing 16, which can include a tailpipe, at the outlet side of the filter assembly 13.

The filter assembly 13 has a housing 22 and a diesel particulate filter 20 disposed therein. The filter assembly 10 may connect with a catalytic device 18 located between the engine 12 and the filter assembly 10. The housing 22 has a first conduit 24 in fluid communication with the entrance tubing 14. The opposite second conduit 26 is in fluid communication with the exit tubing 16.

A temperature control device 30 is installed in the exhaust system 10 to lower the temperature of the filtered exhaust. The temperature control device 30 is in fluid communication with the diesel particulate filter 20 to receive filtered exhaust, preferably with second conduit 26. The temperature control device can also include exit tubing 16 in fluid communication with the outside air. The temperature control device 30 has at least one inlet and preferably multiple inlets 38, 39, 40, 41, such as slits within the sidewall 34. While four inlets are preferred in this embodiment, a different number of inlets can be used. The sidewall 34 can be angled at the inlets 38, 39, 40, 41. Each inlet can be curvilinear, such as a U-shape, or V-shaped. The inlets allow ambient air into the exhaust system 10 which provides a venturi effect in the filtered exhaust stream.

The temperature control device 30 can include an exhaust diffuser 32 with the inlets 38, 39, 40, 41 and is in fluid communication with the diesel particulate filter 20 and exit tubing 16. The exhaust diffuser 32 has a cylindrical sidewall 34 surrounding a diffuser pipe 36. The inlets 38, 39, 40, 41 can be bordered by a diffuser wall extending from the sidewall 34 to further direct the flow of air into the exhaust diffuser 32. The diffuser wall 34 can extend outwardly and/or inwardly.

The exhaust diffuser 32 can have a collar 44 engaging the second conduit 26 at an entrance end 74. A slanted shoulder 46 extends from the collar 44 to the sidewall 34.

The exit tubing 16 can engage the sidewall 34 of the exhaust diffuser 32 opposite the collar 44 at an exit end 76. The diffuser pipe 36 is in fluid communication with the exit tubing 16 and can narrow in diameter between the entrance end 74 and the exit end 76 of the exhaust diffuser 32.

A duct 50 surrounds the inlets 38, 39, 40, 41 to form a temperature control apparatus 48. The duct 50 has a vented end 52 and an opposite closed end 54. The duct 50 has a top 56, a bottom 58 and opposite closed first and second lateral walls 60, 61 between the top 54 and bottom 56. The top 56 and bottom 58 can join at the closed end 54, and closed end edges of the top 56 and bottom 58 can extend outward to form a seam that is fastened together with adhesive, fusing, soldering, bonding, screws and other fasteners, and the like. The lateral walls 60, 61 can be inset from the edge of the top 54 and bottom 56. The edges of the lateral walls 60, 61 can extend outward to allow easier assembly of the duct 50, such as by fastening the top 56, bottom 58 to the lateral walls 60, 61 with an adhesive or by fusing, soldering, bonding, screws and other fasteners, and the like.

The duct 50 preferably has a head section 64 surrounding the inlets 38, 39, 40, 41 and includes the closed end 54. A base section 62 in the duct extends from the vented end 52 to the head section 64. The base section 62 has a vent 51, preferably at the vented end 52. The vent 51 allows cooler ambient air to flow into the duct 50, through the base section 62 and into the head section 64 where the air flows to the exhaust diffuser 32. The air can next flow through the inlets 38, 39, 30, 41 and mix with and cool the exhaust stream.

The interior faces 80, 82 of the top 56 and the bottom 58 can have grooves 78 extending from the base section 62 to the closed end 54 of the head section 64. The exterior faces of the top 56 and the bottom 58 can have ridges 79 corresponding to the grooves 78 extending from the base section 62 to the closed end 54 of the head section 64.

The distance between the top 56 and the bottom 58 of the base section 62 is can be constant and the vent 51 rectangular. The head section 64 is preferably curved. The distance between the top 56 and the bottom 58 of the head section 64 can increase from the base section 62 to a maximum distance at the exhaust diffuser 32. More preferably, the distance between the top 56 and the bottom 58 of the head section 64 increases to a maximum distance, such as at the diameter of the exhaust diffuser 32, then decreases until reaching the closed end 54.

The duct 50 has a first opening 84 in the first lateral wall 60 through which the second conduit 26 or collar 44 can extend. The second lateral wall 61 has a second opening 86 through which one end of the exit tubing 16 can extend.

Figure 10:
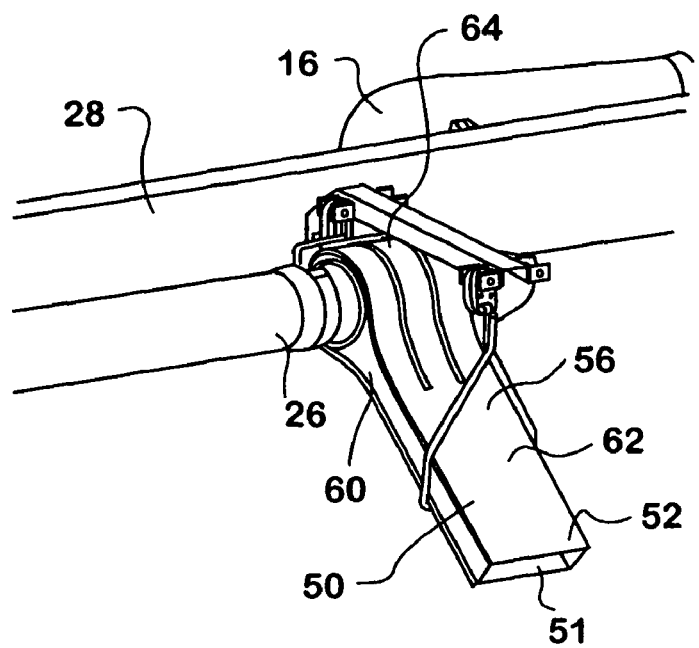
FIG. 10 is a perspective view of a temperature control apparatus of the invention installed in a motor vehicle.
Figure 11:
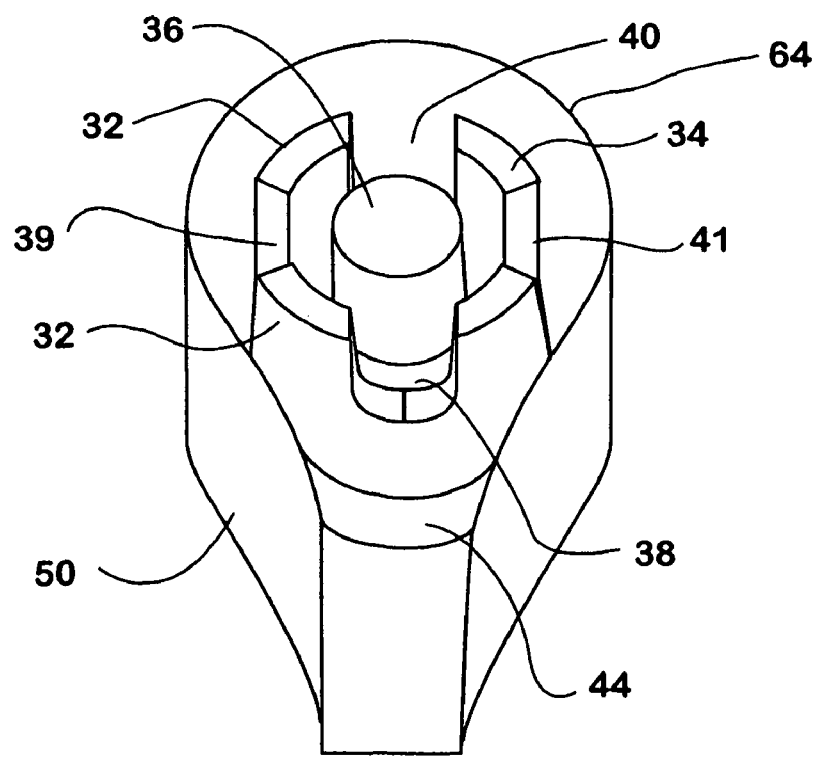
FIG. 11 is a partial perspective view of a temperature control apparatus of the invention along line A-A, where one of the inlets of the exhaust diffuser is aligned with the vent.

When installed in the vehicle 11 as shown in FIG. 10, the duct 50 preferably angles downward with the vented end 52 at the lowest point. This reduces the amount of dirt, dust, debris, water, and the like, from entering into the temperature control device 30 while allowing ambient air to flow into the duct 50 through the vent 51.

The duct 50 hangs from the chassis 28 of the vehicle 11 using at least one hanger. A first hanger 66 has arms 67 extending at least partway under the base section 62. A second hanger 68 has arms 70 that engage the second conduit 26 and the exit tubing 16 with the head section 64 therebetween. A hanger frame can be used to attach the hangers 66, 68 to the chassis. Each hanger 66, 68 preferably has an isolator 72 to shield against bumps and shocks to the temperature control apparatus 48. Clamps or other fastening devices can be used at either side of the duct 50 to install the hanger frame to the exhaust system.

The duct 50 is easily added to the temperature control device 30 and the exhaust system 10 during assembly. The duct 50 is assembled with the temperature control device 30 to form the temperature control apparatus 48 without the second conduit 26 and exit tubing 16 or the temperature control assembly.

EXAMPLE

The alignment of the inlets of the temperature control device in the duct was tested in the exhaust system using computational fluid dynamics with FLUENT modeling software to measure and calculate velocity, temperature and pressure. The temperature control apparatus 48 of the exhaust diffuser 32 and duct 50 was tested with one of the inlets 38 of the exhaust diffuser 32 aligned with the vent 51 of the duct 50. A second temperature control apparatus 148 of the exhaust diffuser 32 and duct 50 was tested with the inlets of the exhaust diffuser 32 rotated 45E from the inlets of the first temperature control apparatus 48. This rotation aligned the sidewall 34 with the vent 51 of the duct 50. The Tmax_exit, Tave_exit, del_P and cold air mass flow rate were calculated for both assemblies with the FLUENT software.

Figure 12:
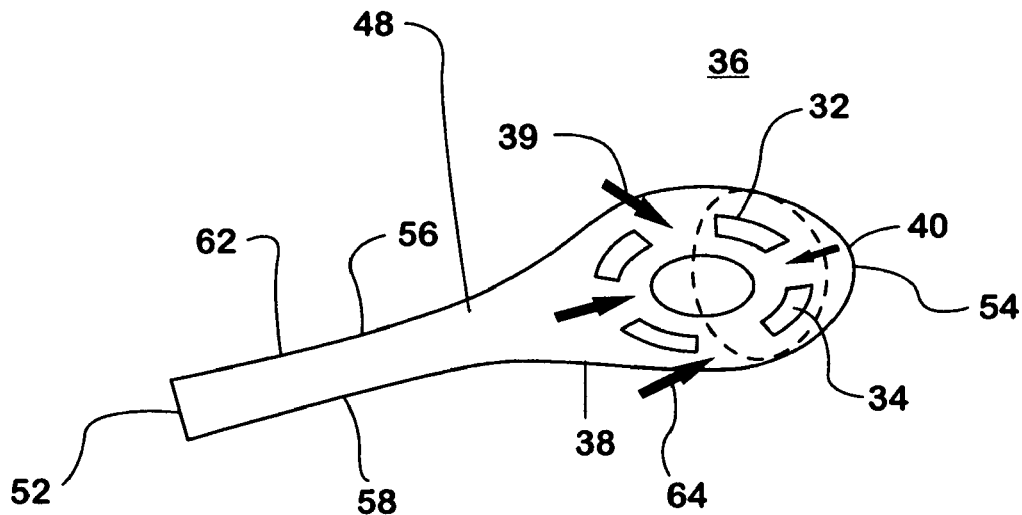
FIG. 12 is a cross section of a temperature control apparatus of the invention of FIG. 9 along line A-A, where one of the inlets of the exhaust diffuser is aligned with the vent as tested in the Example, with the magnitude and direction of the velocity indicated by the arrows and the dotted line showing the concentration of the cold flow.

The test had the following results for the first temperature control apparatus 48. The Tmax_exit=459EC, Tave_exit=369EC, del_P=0.676 in. Hg. The cold air mass flow rate was 0.240 kg/s, which was 69% of the hot exhaust mass flow rate. As shown by the oval in FIG. 12, the cold flow was concentrated near the closed end of the duct, where the exhaust diffuser was located. The cold flow bent the hot exhaust stream to the left when measuring the static temperature at mid-plane. The asymmetry of cold flow distribution at the inlets caused a skewed hot jet of exhaust stream and a diminishing mixing efficiency. As shown in FIG. 12, the arrows designate the magnitude and direction of the velocity.

Figure 13:
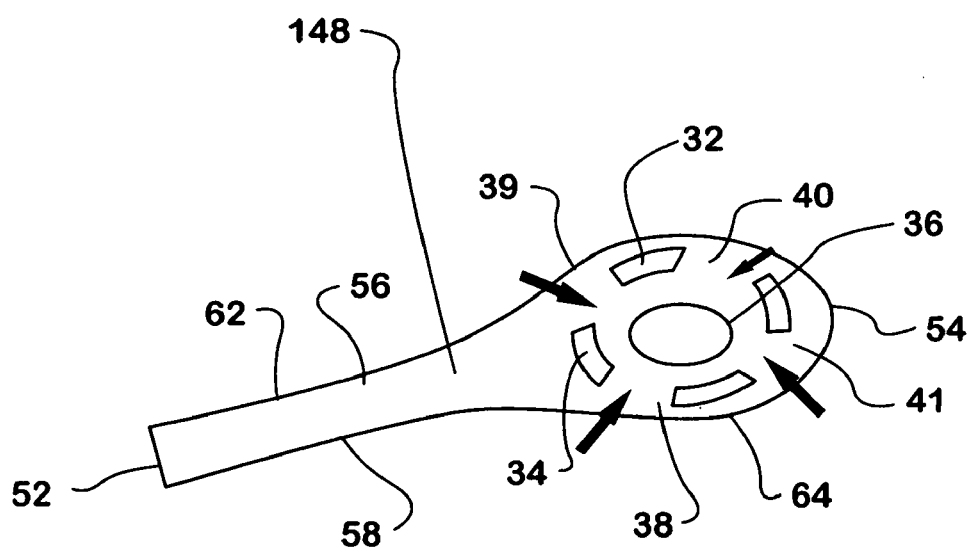
FIG. 13 is a cross section of a temperature control apparatus of the invention of FIG. 9 along line A-A, where the exhaust diffuser is rotated 45E from the exhaust diffuser shown in FIG. 11 as tested in the Example, with the magnitude and direction of the velocity indicated by the arrows.

The second temperature control apparatus 148 with the exhaust diffuser rotated 45E had a Tmax_exit=453EC, Tave_exit=374EC, del_P=0.681 in. Hg. The cold air mass flow rate was 0.231 kg/s, which was 66% of the hot exhaust mass flow rate. The asymmetry of cold flow distribution at the inlets also caused a skewed hot jet of exhaust stream for the 45E rotated second temperature control apparatus 148 and a diminishing mixing efficiency. As shown in FIG. 13, the arrows designate the magnitude and direction of the velocity.

The results in the Example show the inlets of the exhaust diffuser 32 could be aligned without any particular orientation for the temperature control apparatus to work well. The preferred embodiment, as the results show, is the first apparatus 48 where one of the inlets aligns with the vent 51 in the base section 62 of the duct 50. This alignment increased the cooling efficiency of the first temperature control apparatus 48 over the second temperature control apparatus 148.

There are a number of advantages of the using the duct and the temperature control apparatus of the invention. One advantage is that the duct increases the cooling efficiency of the temperature control device.

Another advantage is that the duct directs ambient air from outside of the vehicle instead of drawing the air from under the chassis. This ambient air is cooler than the air found directly under the chassis, which is heated by the vehicle and the road.

A further advantage is that the duct can limit the amount of debris, water and the like that can enter the exhaust diffuser and the temperature control device. A still further advantage is that the duct can prevent hot exhaust gasses from escaping the exhaust system when the exhaust pipe is blocked.

While the invention is shown in only one of its forms, it is not thus limited but is susceptible to various changes and modifications without departing from the spirit and scope of the invention.

What is claimed is:

1. A temperature control apparatus for filtered exhaust from a diesel particulate filter in a vehicle, comprising:
   an exhaust diffuser;
   inlets in the exhaust diffuser;
   a duct having a top, a bottom, opposite first and second lateral walls between the top and bottom, a closed end, and an opposite vented end;
   a head section in the duct surrounding the exhaust diffuser and including the closed end;
   a base section in the duct having a vent and extending from the head section away from the exhaust diffuser to the vented end, wherein the distance between the top and the bottom of the base section is constant, and the distance between the top and the bottom of the head section increases from the base section to a maximum distance at the exhaust diffuser;
   a first opening in the first lateral wall; and
   a second opening in the second lateral wall.

2. A temperature control apparatus for filtered exhaust from a diesel particulate filter in a vehicle of claim 1, wherein the top and the bottom join to form the closed end.

3. A temperature control apparatus for filtered exhaust from a diesel particulate filter in a vehicle of claim 2, wherein the top and the bottom have interior faces with grooves extending from the base section to the closed end.

4. A temperature control apparatus for filtered exhaust from a diesel particulate filter in a vehicle of claim 2, wherein at least one of the inlets is aligned with the vent.

5. A temperature control apparatus for filtered exhaust from a diesel particulate filter in a vehicle of claim 4, further comprising:
   at least one hanger engaging the duct.

6. A temperature control assembly for filtered exhaust from a diesel particulate filter in a vehicle, comprising:
   a temperature control device having inlets, a conduit, and exit tubing;
   a duct having a vented end, an opposite closed end, a top, a bottom, opposite first and second lateral walls between the top and bottom, a first opening in the first lateral wall through which the conduit extends, and a second opening in the second lateral wall through which the exit tubing extends;
   a head section in the duct surrounding the inlets in the temperature control device and including the closed end; and
   a base section in the duct having a vent, and extending from the head section to the vented end.

7. A temperature control assembly for filtered exhaust from a diesel particulate filter in a vehicle of claim 6, wherein the distance between the top and the bottom of the base section is constant and the distance between the top and the bottom of the head section increases from the base section to a maximum distance at the inlets of the temperature control device.

8. A temperature control assembly for filtered exhaust from a diesel particulate filter in a vehicle of claim 7, wherein the top and the bottom join at the closed end.

9. A temperature control assembly for filtered exhaust from a diesel particulate filter in a vehicle of claim 8, wherein the top and the bottom have interior faces with grooves extending from the base section to the closed end.

10. A temperature control assembly for filtered exhaust from a diesel particulate filter in a vehicle of claim 9, wherein the conduit is in fluid communication with the diesel particulate filter, and
    the exit tubing is in fluid communication with the conduit and ambient air.

11. A temperature control assembly for filtered exhaust from a diesel particulate filter in a vehicle of claim 7, wherein at least one of the inlets is aligned with the vent.

12. A temperature control assembly for filtered exhaust from a diesel particulate filter in a vehicle of claim 11, further comprising:

at least one hanger engaging the duct.

13. A temperature control assembly for filtered exhaust from a diesel particulate filter in a vehicle of claim 12, wherein the conduit is in fluid communication with the diesel particulate filter, and the exit tubing is in fluid communication with the conduit and ambient air.

14. A temperature control assembly for filtered exhaust from a diesel particulate filter in a vehicle of claim 13, further comprising:

a chassis in the vehicle engaging the hanger.

* * * * *